United States Patent
Li et al.

(10) Patent No.: US 12,501,102 B2
(45) Date of Patent: Dec. 16, 2025

(54) METHOD AND APPARATUS FOR GENERATING INTERACTIVE VIDEO

(71) Applicant: SHANGHAI BILIBILI TECHNOLOGY CO., LTD., Shanghai (CN)

(72) Inventors: Chaoran Li, Shanghai (CN); Hao Wang, Shanghai (CN); Zhicong Zang, Shanghai (CN); Zhong Dong, Shanghai (CN); Zhaozheng Wang, Shanghai (CN); Yicong Mei, Shanghai (CN); Lin Wang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 84 days.

(21) Appl. No.: 18/279,843

(22) PCT Filed: Jan. 20, 2022

(86) PCT No.: PCT/CN2022/072989
§ 371 (c)(1),
(2) Date: Aug. 31, 2023

(87) PCT Pub. No.: WO2022/183866
PCT Pub. Date: Sep. 9, 2022

(65) Prior Publication Data
US 2024/0155175 A1 May 9, 2024

(30) Foreign Application Priority Data
Mar. 4, 2021 (CN) .......................... 202110238739.6

(51) Int. Cl.
*H04N 21/472* (2011.01)
*H04N 21/426* (2011.01)
(Continued)

(52) U.S. Cl.
CPC ..... *H04N 21/42607* (2013.01); *H04N 21/426* (2013.01); *H04N 21/431* (2013.01); *H04N 21/44* (2013.01); *H04N 21/47205* (2013.01)

(58) Field of Classification Search
CPC ........... H04N 21/431; H04N 21/47205; H04N 21/42607; H04N 21/426; H04N 21/44
See application file for complete search history.

(56) References Cited

U.S. PATENT DOCUMENTS 7,577,978 B1 * 8/2009 Wistendahl ........... A63F 13/338
725/111
8,166,500 B2 * 4/2012 Sakhartov .......... H04N 21/8545
725/60

(Continued)

FOREIGN PATENT DOCUMENTS

CN        107071546 A    8/2017
CN        107736033 A    2/2018
(Continued)

OTHER PUBLICATIONS

International Patent Application No. PCT/CN2022/072989; Int'l Search Report; dated Apr. 7, 2022; 2 pages.

*Primary Examiner* — Pinkal R Chokshi
(74) *Attorney, Agent, or Firm* — BakerHostetler

(57) ABSTRACT

This application provides techniques of generating interactive videos. The techniques comprise obtaining an original video, creating an interactive track for the original video to obtain an initial video, and adding an interactive component to the interactive track; and generating an interactive video by rendering at least one interactive video frame and other video frames of the initial video based on the interactive component. In this way, an interactive video with an interactive capability can be generated without additionally adding a data channel to implement an interaction function, (Continued)

Obtain an original video, create an interactive track for the original video to obtain an initial video, and add an interactive component to the interactive track — 102

Render at least one interactive video frame and a video frame of the initial video based on the interactive component, to obtain an interactive video — 104 thereby reducing processing load of a terminal and reducing resource consumption of the terminal.

17 Claims, 8 Drawing Sheets

(51) Int. Cl.
  *H04N 21/431* (2011.01)
  *H04N 21/44* (2011.01)

(56) References Cited

U.S. PATENT DOCUMENTS

| | | |
|---|---|---|
| 9,082,092 B1 * | 7/2015 | Henry ................... A63F 13/335 |
| 2002/0188628 A1 | 12/2002 | Cooper et al. |
| 2013/0195427 A1 | 8/2013 | Sathish |
| 2017/0004861 A1 * | 1/2017 | Wolfkill ............. H04N 21/4722 |
| 2018/0121069 A1 * | 5/2018 | DiVerdi ................... G06T 11/60 |
| 2018/0288483 A1 * | 10/2018 | Wang ................... H04N 21/812 |
| 2021/0144452 A1 * | 5/2021 | Cutaia .............. H04N 21/23614 |
| 2023/0057703 A1 * | 2/2023 | Lyu ....................... G11B 27/031 |

FOREIGN PATENT DOCUMENTS

| | | |
|---|---|---|
| CN | 111031395 A | 4/2020 |
| CN | 111314767 A | 6/2020 |
| CN | 112153439 A | 12/2020 |
| CN | 112165652 A | 1/2021 |
| CN | 112261481 A | 1/2021 |

\* cited by examiner

METHOD AND APPARATUS FOR GENERATING INTERACTIVE VIDEO

CROSS-REFERENCE TO RELATED APPLICATIONS

This application is the U.S. National Stage of International Application No. PCT/CN2022/072989, filed on Jan. 20, 2022, which claims priority to Chinese Patent Application No. 202110238739.6, filed on Mar. 4, 2021, and entitled "INTERACTIVE VIDEO GENERATION METHOD AND APPARATUS", both of which are incorporated herein by reference in their entireties.

TECHNICAL FIELD

This application relates to the field of multimedia technologies, and in particular, to an interactive video generation method. This application also relates to an interactive video generation apparatus, a computing device, and a computer-readable storage medium.

BACKGROUND

With development of science and technology, a user can interact with content in a video while watching the video on a terminal. Such a video providing an interaction function is referred to as an interactive video. The interactive video provides the user with a video form for plot interaction, and can bring richer watching experience to the user.

However, an existing interactive video does not have an interactive capability. A video format of the interactive video supports only video playing, but cannot support interaction within the video. An interaction function of the interactive video needs to be implemented through an additional data channel. In other words, the video and interaction logic are separated, and are displayed to the user through different data channels. In this case, in addition to displaying the video, the terminal needs to provide an additional data channel to display the interaction function. This increases processing load of the terminal, and wastes resources of the terminal.

SUMMARY

In view of this, embodiments of this application provide an interactive video generation method. This application also relates to an interactive video generation apparatus, a computing device, and a computer-readable storage medium, to resolve a problem in a conventional technology that processing load of a terminal is increased and resources of the terminal are wasted.

According to a first aspect of the embodiments of this application, an interactive video generation method is provided, including:

obtaining an original video, creating an interactive track for the original video to obtain an initial video, and adding an interactive component to the interactive track; and rendering at least one interactive video frame and a video frame of the initial video based on the interactive component, to obtain an interactive video.

According to a second aspect of the embodiments of this application, an interactive video generation apparatus is provided, including:

a creation module, configured to: obtain an original video, create an interactive track for the original video to obtain an initial video, and add an interactive component to the interactive track; and a rendering module, configured to render at least one interactive video frame and a video frame of the initial video based on the interactive component, to obtain an interactive video.

According to a third aspect of the embodiments of this application, a computing device is provided, including a memory, a processor, and computer instructions stored in the memory and being capable of running on the processor. When the processor executes the instructions, steps of the interactive video generation method are implemented.

According to a fourth aspect of the embodiments of this application, a computer-readable storage medium is provided. The computer-readable storage medium stores computer instructions, and when the instructions are executed by a processor, steps of the interactive video generation method are implemented.

In the interactive video generation method provided in this application, the original video is obtained, the interactive track is created for the original video to obtain the initial video, and the interactive component is added to the interactive track; and the at least one interactive video frame and other video frames of the initial video are rendered based on the interactive component to generate the interactive video. In this solution, the interactive track is created for the original video to obtain the initial video, and the interactive component is added to the interactive track to fuse interaction logic and the initial video. In addition, the video frames are rendered based on the interactive component to generate the interactive video. The interactive video includes the interaction logic. In this way, an interactive video with an interactive capability can be obtained without additionally adding a data channel to implement an interaction function, thereby reducing processing load of a terminal and reducing resource consumption of the terminal.

DESCRIPTION OF EMBODIMENTS

Figure 1:
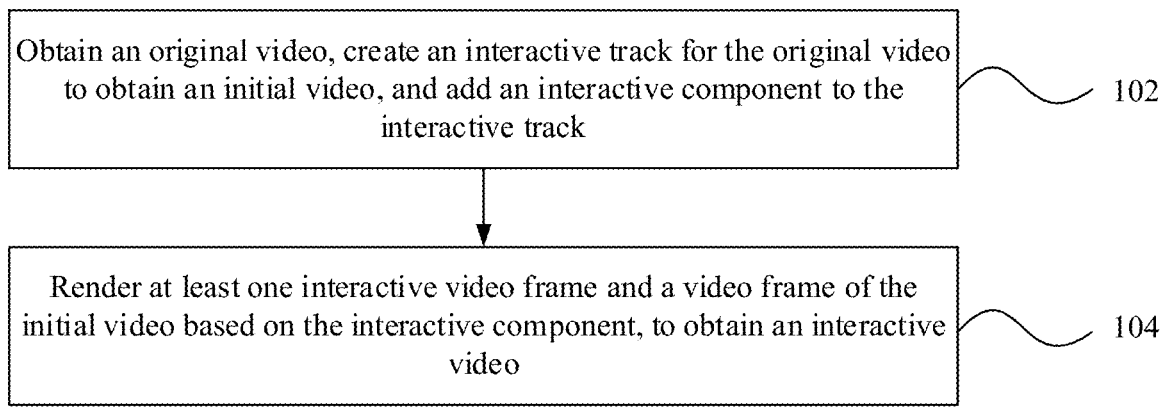
FIG. 1 is a flowchart of an interactive video generation method according to an embodiment of this application.

Many specific details are described in the following description to facilitate full understanding of this application. However, this application can be implemented in many other manners different from those described herein, and a person skilled in the art can make similar promotion without departing from the connotation of this application. Therefore, this application is not limited to specific implementations disclosed below.

Terms used in one or more embodiments of this application are merely used to describe a specific embodiment, and are not intended to limit the one or more embodiments of this application. Singular forms "a", "the", and "said" used in one or more embodiments of this application and the appended claims are also intended to include plural forms, unless otherwise specified in the context clearly. It should also be understood that, the term "and/or" used in one or more embodiments of this application indicates and includes any or all of possible combinations of one or more associated listed items.

It should be understood that although the terms such as "first" and "second" may be used in one or more embodiments of this application to describe various types of information, the information should not be limited to these terms. These terms are only used to distinguish between information of a same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

First, nouns used in one or more embodiments of this application are explained.

Interaction is any interactive feature such as a bullet-screen comment, a tag, a jump of an interactive video on a video, and may be used as executable script information.

An interactive video provides an interactive component, and is a video form that may be used to interact with a user. The interaction includes but is not limited to plot interaction.

An original video is a video without an interaction function, and may also be understood as a video that is selected by the user and to which an interaction function is to be added.

An initial video is a video obtained after an interactive track is added to the original video, and may include at least two sub-videos.

An interactive track is a track that is used to add an interactive component and that collects interactive data by using the interactive component.

An interactive node is a node that needs to interact with the user in the initial video.

An interactive component is a component that can implement a human-machine interaction function. To be specific, any function that can allow the user to participate in video interaction may be encapsulated into a component, and a component obtained through encapsulation is referred to as the interactive component.

A graphics engine is a functional component used for graphics drawing. With rapid development of graphics software and hardware technologies, the graphics engine is also developed rapidly, and is applied to fields such as animation, virtual reality, game development, and simulation.

Next, an application scenario of an interactive video generation method provided in embodiment of this application is briefly described.

Currently, more software can provide a user with an interactive video production function, so that the user can add an interaction function to an original video, to obtain an interactive video with an interaction function. The interactive video can bring richer experience to the user.

In an existing interactive video production manner, a set of interaction logic is usually set separately. The set of interaction logic is displayed while a video is played, so that the video and the interaction logic are synchronized, to achieve an interactive effect. However, in this manner, the video and the interaction logic are separated, to respectively display the video and the interaction function through different data channels. For example, interaction is performed by using a bullet-screen comment. Bullet-screen comment information on a video is a separate bullet-screen comment layer, and is separated from the video. In this case, processing load of a terminal is increased, and resources of the terminal are consumed.

To resolve the foregoing problem, this application provides an interactive video generation method. Interaction logic and a video are fused, to obtain an interactive video. For a specific implementation thereof, refer to descriptions in the following embodiments.

In this application, an interactive video generation method is provided. This application also relates to an interactive video generation apparatus, a computing device, and a computer-readable storage medium, which are described in detail in the following embodiments one by one.

FIG. 1 is a flowchart of an interactive video generation method according to an embodiment of this application. The method specifically includes the following steps.

Step 102: Obtain an original video, create an interactive track for the original video to obtain an initial video, and add an interactive component to the interactive track.

Specifically, the interactive component may be a component that can implement a human-machine interaction function. To be specific, any function that can allow a user to participate in video interaction may be encapsulated into a component, and a component obtained through encapsulation is referred to as the interactive component.

For example, the interactive component may include at least one interactive option, and the at least one interactive option is related to a plot selection behavior. In other words, the at least one interactive option is related to a video frame to be played subsequently. When the user triggers the at least one interactive option, a device may determine a next video frame to be played based on selection of the user. In other words, the user may select a plot of the interactive video by selecting different interactive options, to interact with the interactive video. In addition, the interactive component may further include other interaction behaviors such as "like", "follow", "vote", "favorite", "subscribe", and "comment". The user may implement the functions by triggering the interactive component, to interact with the interactive video.

In addition, each interactive component may include at least one of the foregoing interaction behaviors. To be specific, the foregoing plurality of interaction behaviors each may be used as an independent interactive component, or two or more thereof may be combined to form an integrated component as the interactive component.

In a specific implementation, if the user wants to produce an interactive video with an interaction function, an original video without an interaction function needs to be first obtained. An interactive track is newly added to the original video based on an original track of the original video, so that a multi-track initial video different from the original video can be obtained. In addition, to fuse interaction logic and a video, the interactive component may be added to the interactive track, so that the interaction logic can be fused into the initial video during subsequent rendering.

In an actual application, a video to which an interaction function is to be added may be obtained from a local file of a terminal, and is used as the original video; or a video may be shot by a camera of a terminal, and is used as the original video; or a video of interest may be downloaded by using a terminal, and is used as the original video; or a video of interest may be downloaded by using a terminal, video clipping is performed, and an obtained video is used as the original video, or the like. The foregoing is merely an example implementation of obtaining the original video in this embodiment of this application. A manner of obtaining the original video is not limited in this embodiment of this application.

In an optional implementation of this application, a specific implementation of the creating an interactive track for the original video may include: obtaining playing duration of the original video, and determining a track length of a video track; and creating the interactive track based on the track length.

Specifically, the video track is an original track of the original video. For example, the video track is used to display a video, and there may be at least one video track. Usually, there may be three video tracks.

In an example, the user may upload the original video to a server by using the terminal, and the terminal may display an interactive control. The user may trigger the interactive control, and the terminal receives an interactive video production instruction of the user, and sends the instruction to the server. The server may add the interaction logic to the original video, to obtain the interactive video. In addition, to fuse the interaction logic into the original video instead of separating the interaction logic from the original video, the server may first create the interactive track for the original video.

In a specific implementation, the playing duration of the original video may be obtained, the playing duration is converted into standard playing duration measured by frame, a corresponding duration-length ratio is found based on the standard playing duration, and the track length of the video track is determined based on the duration-length ratio. Then, a track whose length is the track length is created and used as the interactive track.

In an example, a conversion between the playing duration and the standard playing duration may be implemented based on a preset conversion relationship. For example, assuming that the playing duration is 5 seconds and that the preset conversion relationship is that 1 second includes 24 frames of video images, the standard playing duration is 120 frames.

In an example, the duration-length ratio is preset, and the ratio is related to the standard playing duration. For example, longer standard playing duration indicates a larger duration-length ratio, and shorter standard playing duration indicates a smaller duration-length ratio. For example, for a video whose standard playing duration is less than 20 frames, the duration-length ratio is that one frame corresponds to 1 centimeter, and for a video whose standard playing duration is greater than 20 frames and less than 60 frames, the duration-length ratio is that 10 frames correspond to 1 centimeter.

For example, if the playing duration of the original video is 2 seconds, assuming that 1 second includes 24 frames, standard playing duration of the original video is 48 frames. Assuming that the preset duration-length ratio is that 10 frames correspond to 1 centimeter, the track length of the video track of the original video is 4.8 centimeters.

In a specific implementation, the original video may be opened in video editing software. In this case, the video track of the original video may be displayed on a page of the terminal, and the page may include an option "Add a track". In response to a selection operation performed on the option, an interactive track whose length is the same as the track length of the video track may be generated.

For example, assuming that the original video includes three video tracks, after the interactive track is added, a four-track video may be obtained. The four-track video is referred to as the initial video for ease of description.

In this embodiment of this application, an interactive track may be created for the original video based on the playing duration of the original video, to obtain an initial video different from the original video. The interactive track is added, to implement a first step of fusing the interaction logic and the video. The interactive track is used to implement the interaction function, and the interactive track is a part of the video, to avoid separating the interaction logic from the video.

In an optional implementation of this application, the initial video includes at least two sub-videos, and the adding an interactive component to the interactive track includes: determining a playing order of the at least two sub-videos based on interaction logic; using, as a target sub-video, a sub-video that does not rank last in the playing order in the at least two sub-videos; and adding the interactive component to the interactive track based on a playing time point of at least one video frame of the target sub-video.

There may be at least one target sub-video.

Specifically, the initial video may include at least two sub-videos, and plots of the at least two sub-videos may be partially coherent and partially incoherent. For example, it is assumed that the at least two sub-videos are three sub-videos, a plot of the 1st sub-video is that a target is shot and a bullet flies out, a plot of the 2nd sub-video is that the bullet hits a bullseye and the target is broken, and a plot of the 3rd sub-video is that the bullet does not hit a bullseye and the target is intact.

Specifically, the interaction logic may be logic preset by the user, and may be used to limit the playing order of the sub-video. For example, the interaction logic may be that the bullet first flies out, and then the bullet hits the bullseye, or the bullet misses the target. Only one of a case in which the bullet hits the bullseye and a case in which the bullet misses the target can be displayed based on selection of the user. Alternatively, the interaction logic may be displaying a card drawing interface and then displaying a drawn card, and the drawn card is randomly displayed.

In a specific implementation, the playing order of the at least two sub-videos may be determined based on the interaction logic, and a sub-video played before each sub-video and a sub-video played after the sub-video may be determined. In this embodiment of this application, if an operation performed by the user on the interactive component is received, the sub-video continues to be played based on the operation performed by the user. Therefore, a sub-video that ranks last in the playing order is a sub-video selected and played after the operation performed by the user is received, and a sub-video that needs to be played does not exist after the sub-video, indicating that the sub-video does not include an interactive component. Therefore, the sub-video that does not rank last in the playing order may not be considered when the interactive component is added. For ease of description, the sub-video that does not rank last in the playing order in the at least two sub-videos is referred to as the target sub-video, and a sub-video that needs to be played further exists after the target sub-video, indicating that the target sub-video may include an interactive component. Therefore, the interactive component may be added to the interactive track based on the playing time point of the at least one video frame of the target sub-video.

Figure 2:
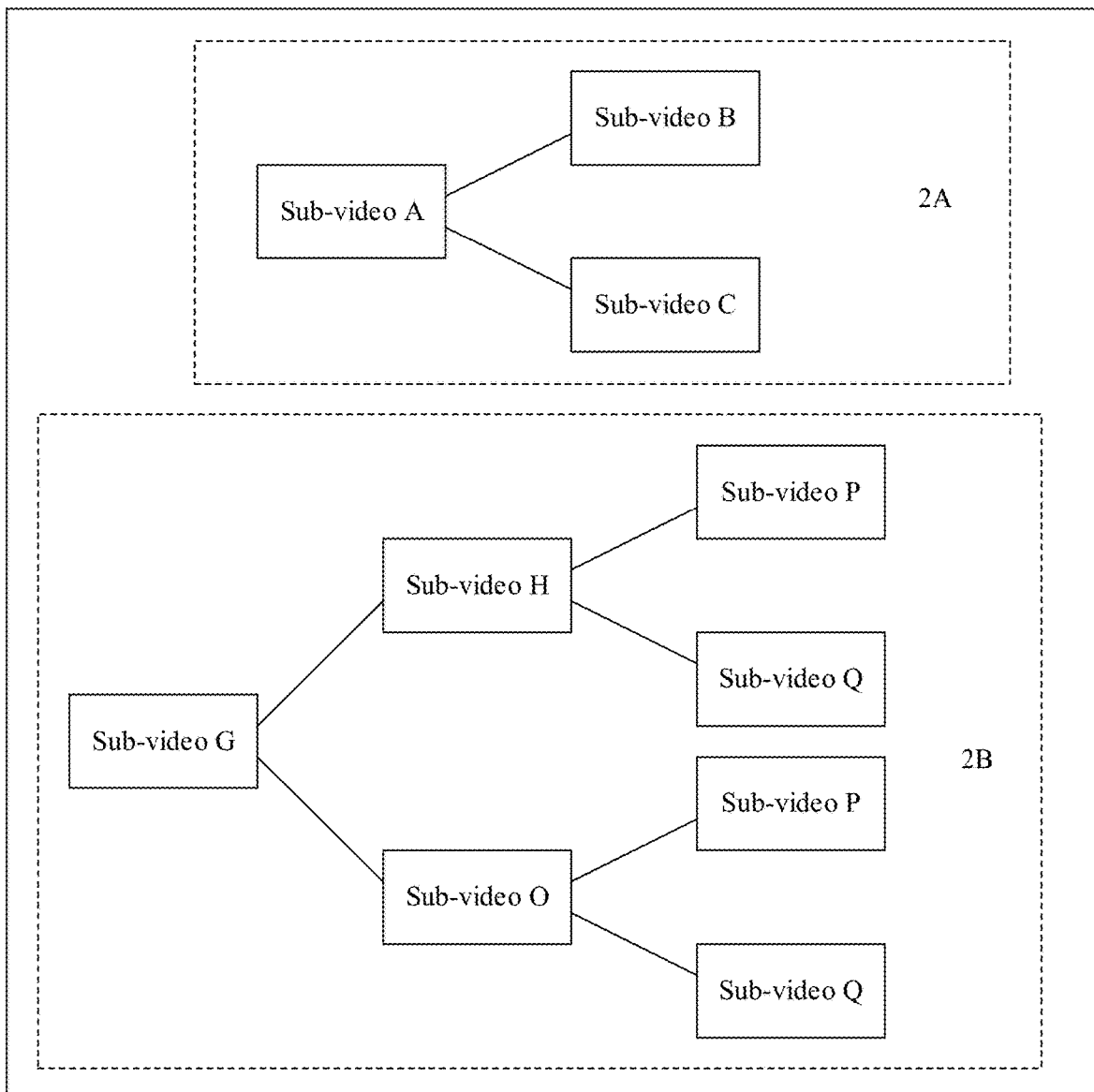
FIG. 2 is a schematic diagram of interaction logic according to an embodiment of this application.

For example, referring to 2A in FIG. 2, it is assumed that the at least two sub-videos are three sub-videos: a sub-video A, a sub-video B, and a sub-video C, a plot of the sub-video A is that a target is shot and a bullet flies out, a plot of a sub-video B is that the bullet hits a bullseye and the target is broken, and a plot of a sub-video C is that the bullet does not hit a bullseye and the target is intact. It may be determined, based on the interaction logic, that the sub-video A ranks before the sub-video B and the sub-video C in a playing order, and the sub-video B and the sub-video C rank the same in the playing order, but only one of the sub-video B and the sub-video C can be played. It may be determined that the sub-video B and the sub-video C each are a sub-video that ranks last in the playing order. In this case, the sub-video A may be determined as a target sub-video, and at least one video frame of the sub-video A may be obtained. Therefore, the interactive component may be added to the interactive track based on a playing time point of the at least one video frame of the sub-video A.

For example, referring to 2B in FIG. 2, it is assumed that the at least two sub-videos are five sub-videos: a sub-video G, a sub-video H, a sub-video O, a sub-video P, and a sub-video Q, a plot of the sub-video G is going back to the dormitory after school to play a game, a plot of the sub-video H is playing a game T, a plot of the sub-video O is playing a game W, a plot of the sub-video P is playing a game with topping up and winning the game, and a plot of the sub-video Q is playing a game without topping up and losing the game. It may be determined, based on the interaction logic, that the sub-video G ranks first in a playing order, the sub-video H and the sub-video O both rank second in the playing order, the sub-video P and the sub-video Q both rank third in the playing order, and only one of two sub-videos rank the same in the playing order can be played. Therefore, it may be determined that the sub-video P and the sub-video Q each are a sub-video that ranks last in the playing order. In this case, the sub-video G, the sub-video H, and the sub-video O may be determined as target sub-videos, and at least one video frame of the sub-video G, at least one video frame of the sub-video H, and at least one video frame of the sub-video O are obtained. Therefore, the interactive component may be added to the interactive track based on playing time points of the at least one video frame of the sub-video G, the at least one video frame of the sub-video H, and the at least one video frame of the sub-video O.

For example, it is assumed that the at least two sub-videos are two sub-videos: a sub-video E and a sub-video F, plot content of the sub-video E is starting to draw a card, plot content of the sub-video F is displaying a drawn card, and the drawn card is randomly displayed. It is determined, based on the interaction logic, that the sub-video E ranks before the sub-video F in a playing order. In this case, the sub-video E may be used as a target sub-video, at least one video frame of the sub-video E is obtained, and the interactive component is added to the interactive track based on a playing time point of the at least one video frame of the sub-video E.

In this embodiment of this application, the initial video includes at least two sub-videos, and the playing order of the at least two sub-videos may be determined based on preset logic. Because no sub-video is played after a sub-video that ranks last in the playing order, the sub-video that ranks last in the playing order may not be considered when the interactive component is added to the interactive track. The sub-video that does not rank last in the playing order in the at least two sub-videos may be referred to as the target sub-video, and the at least one video frame of the target sub-video may be obtained. Each video frame corresponds to a playing time point, and the interactive component may be added to the interactive track based on the playing time point of the at least one video frame. In this way, the interaction logic may be added to the interactive track. Because the interactive track is a track of the initial video, the interaction logic may be initially fused into the initial video.

In an optional implementation of this application, a specific implementation of the adding the interactive component to the interactive track based on a playing time point of at least one video frame of the target sub-video may include: using, as an end video frame, a video frame that ranks last in a playing order in the target sub-video; and adding the interactive component to the interactive track based on a playing time point of the end video frame.

In a specific implementation, the playing order of the at least one video frame of the target sub-video may be obtained. Because the target sub-video may display, at the end of playing, an option to the user to make selection, when the interactive component is added, a video frame that ranks higher in the playing order may not be considered, but only a video frame that ranks last in the playing order is considered. For ease of description, the video frame that ranks last in the playing order is referred to as an end video frame, a playing time point of the end video frame in the initial video is obtained, and the interactive component may be added to the interactive track based on the playing time point of the end video frame.

It should be noted that a quantity of target sub-videos is the same as a quantity of interactive components added to the interactive track.

In an example, a specific implementation of obtaining the playing time point of the end video frame in the initial video may include: If the target sub-video is a sub-video that ranks first in the playing order in the initial video, a playing time point of the end video frame in the target sub-video may be used as the playing time point of the end video frame; and if the target sub-video is not a sub-video that ranks first in the playing order in the initial video, the playing time point of the end video frame in the initial video is used as the playing time point of the end video frame.

For example, if the target sub-video is not a sub-video that ranks first in the playing order in the initial video, a reference sub-video that has a logical relationship with the target sub-video and that is played before the target sub-video is determined, and a playing time point of the end video frame in a video including the reference sub-video and the target sub-video is determined. For example, if a sub-video A having a logical relationship with a target sub-video F is included before the target sub-video F, playing duration of the sub-video A is 120 frames, and an end video frame is the 240th frame in the target sub-video, it may be determined that a playing time point of the end video frame is the 360th frame. When 1 second includes 24 frames, the playing time point of the end video frame is the 15th second of the initial video.

For example, assuming that a plot of the target sub-video is that a target is shot and a bullet flies out, and that the target sub-video includes 48 frames, the 48th frame may be used as the end video frame. It is assumed that the target sub-video is a sub-video that ranks first in the playing order in the initial video. Therefore, a playing time point of the 48th frame in the target sub-video may be obtained, and the interactive component may be added to the interactive track based on the playing time point of the 48th frame.

For example, a 1-second video includes 24 frames of video images. Assuming that the target sub-video includes a sub-video G, a sub-video H, and a sub-video O, if a plot of the sub-video G is going back to the dormitory after school to play a game, the sub-video G includes 48 frames, the 48th frame may be used as an end video frame. If a plot of the sub-video H is playing a game T, and the sub-video H includes 120 frames, the 120th frame may be used as an end video frame. If a plot of the sub-video O is playing a game W, and the sub-video O includes 144 frames, the 144th frame may be used as an end video frame. In addition, because the sub-video G is a sub-video that ranks first in the playing order in the initial video, a playing time point (the 48th frame, namely, the 2nd second) of the 48th frame in the sub-video G may be obtained, and the interactive component is added to the interactive track based on the playing time point. The sub-video H and the sub-video O each are a sub-video that ranks second in the playing order in the initial video, and a sub-video that ranks first in the playing order is the sub-video G. Therefore, a playing time point (the 168th frame, namely, the 7th second) of the 120th frame in the initial video may be determined based on playing duration of the sub-video G and a playing time point of the 120th frame in the sub-video H, and the interactive component is added to the interactive track based on the playing time point. In addition, a playing time point (the 192nd frame, namely, the 8th second) of the 144th frame in the initial video may be determined based on playing duration of the sub-video G and a playing time point of the 144th frame in the sub-video O, and the interactive component is added to the interactive track based on the playing time point.

In some embodiments, a specific implementation of the adding the interactive component to the interactive track based on a playing time point of the end video frame may include: determining an interaction location on the interactive track based on the playing time point of the end video frame; and adding the interactive component at the interaction location.

Specifically, essentially, any behavior in which interaction can be performed with the user may be used as an interactive component. In addition, one interaction behavior may be independently used as one interactive component, or two or more interaction behaviors may be combined to form an integrated component. This is not limited in this embodiment of this application.

In a specific implementation, the interactive track is a track measured by length. A length of the track has a specific proportional relationship with playing duration of the initial video. A location of the playing time point on the interactive track may be determined as the interaction location based on the playing time point of the end video frame and the proportional relationship, and the interactive component is added at the interaction location.

For example, it is assumed that the duration-length ratio is that one frame corresponds to 1 centimeter, and it is assumed that the playing time point of the end video frame is the 2nd second, namely, the 48th frame. In this case, it may be determined that the interaction location is the 48th centimeter, and then the interactive component may be added at the 49th centimeter.

In the foregoing method, the interactive component may be added to the interactive track of the initial video to add the interaction logic to the video, and the video and the interaction logic may be fused through the interactive track.

Further, in the foregoing manner, after the interactive component is added at the interaction location on the interactive track, a sub-video identifier of a target sub-video in which the end video frame is located may also be added at the interaction location. In this way, when at least two sub-videos are parallel videos, a specific video in the parallel videos that corresponds to the interactive component may be determined, to avoid a case in which the interactive component incorrectly corresponds to the sub-video, and consequently the obtained interactive video is wrong.

For example, the duration-length ratio is that 10 frames correspond to 1 centimeter. It is assumed that there are two end video frames: an end video frame a and an end video frame b. If a playing time point of the end video frame a is the 5th second, namely, the 120th frame, the interaction location is the 12th centimeter, and an interactive component and a sub-video identifier a may be added at the 12th centimeter. If a playing time point of the end video frame b is the 6th second, namely, at the 144th frame, the interaction location is the 14.4th centimeter, and an interactive component and a sub-video identifier b may be added at the 14.4th centimeter.

Further, before the adding an interactive component to the interactive track, the method further includes: presetting an interactive node in the initial video; and correspondingly, a specific implementation of adding an interactive component to the interactive track may include: determining an interaction location on the interactive track based on the interactive node, and adding the interactive component at the interaction location.

Specifically, the interactive node may include a time point. The time point may be a playing time point in the initial video.

In a specific implementation, the user may preset the interactive node in the initial video by using the terminal, and the interactive node may include a time point. In this case, the interaction location may be determined on the interactive track based on the time point, and the interactive component may be added at the interaction location.

For example, it is assumed that the interactive node is the 2nd second of the original video. When 1 second includes 24 frames of video images, it may be determined that the interactive node is the 48th frame. It may be determined, based on a case in which the duration-length ratio is that 10 frames correspond to 1 centimeter, that the interaction location is the 4.8th centimeter on the interactive track. Therefore, the interactive component may be added at the 4.8th centimeter on the interactive track.

Further, the interactive node may further include a sub-video identifier. Therefore, the sub-video identifier may be further added after the interactive component is added at the interaction location. In this way, when at least two sub-videos are parallel videos, a specific video in the parallel videos that corresponds to the interactive component may be determined, to avoid a case in which the interactive component incorrectly corresponds to the sub-video, and consequently the obtained interactive video is wrong.

For example, the duration-length ratio is that 10 frames correspond to 1 centimeter. It is assumed that there are two interactive nodes: an interactive node a and an interactive node b. A time point included in the interactive node a is the 5th second, namely, the 120th frame, and a sub-video identifier included in the interactive node is a sub-video identifier a. Therefore, the interaction location is the 12th centimeter, and an interactive component and the sub-video a may be added at the 12th centimeter. A time point included in the interactive node b is the 6th second, namely, the 144th frame, and a sub-video identifier included in the interactive node is a sub-video identifier b. Therefore, the interaction location is the 14.4th centimeter, and an interactive component and the sub-video identifier b may be added at the 14.4th centimeter.

In this implementation, the user may preset the interactive node when determining the original video, to reduce an operation of determining the interaction location, and reduce processing consumption of the terminal.

Step 104: Render at least one interactive video frame and a video frame of the initial video based on the interactive component, to obtain an interactive video.

In an optional implementation of this application, before the rendering at least one interactive video frame and a video frame of the initial video based on the interactive component, the method further includes: adding an interactive component at each interaction location to a video frame corresponding to a playing time point of the interaction location, to obtain the at least one interactive video frame; and correspondingly, a specific implementation of the rendering at least one interactive video frame and a video frame of the initial video based on the interactive component may include: rendering the at least one interactive video frame and a video frame other than the at least one interactive video frame in the initial video, to obtain the interactive video.

Specifically, the interactive video frame is a video frame to which an interactive component is added.

In a specific implementation, when a sub-video identifier is added at the interaction location, the interactive component at each interaction location may be added to the video frame corresponding to the playing time point of the interaction location based on the sub-video identifier, to obtain the interactive video frame. In this case, the at least one interactive video frame and another video frame included in the initial video may be rendered, to obtain the interactive video.

Figure 3:
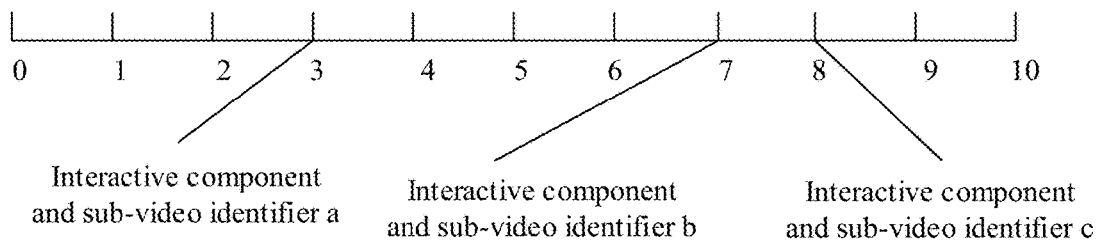
FIG. 3 is a schematic diagram of an interactive track according to an embodiment of this application.

For example, referring to FIG. 3, it is assumed that a track length of the interactive track is 10 centimeters, and interaction locations are the 3rd centimeter, the 7th centimeter, and the 8th centimeter. In this case, a sub-video identifier a is included at the 3rd centimeter, a sub-video identifier b is included at the 7th centimeter, and a sub-video identifier c is included at the 8th centimeter. If a playing time point corresponding to the 3rd centimeter is the 3rd second, namely, the 72nd frame, and a corresponding sub-video identifier is the sub-video identifier a, the 72nd frame of a sub-video a may be determined as an interactive video frame. If a playing time point corresponding to the 7th centimeter is the 7th second, namely, the 168th frame, a corresponding sub-video identifier is the sub-video identifier b, the sub-video a further exists before a sub-video b, and playing duration of the sub-video a is 3 seconds, the 96th frame of the sub-video b may be determined as an interactive video frame. If a playing time point corresponding to the 8th centimeter is the 8th second, namely, the 192nd frame, a corresponding sub-video identifier is the sub-video identifier c, the sub-video a further exists before a sub-video c, and playing duration of the sub-video a is 3 seconds, the 120th frame of the sub-video c may be determined as an interactive video frame. Then, the 72nd frame, the 96th frame, the 120th frame, another video frame of the sub-video a, another video frame of the sub-video b, and another video frame of the sub-video c may be rendered, to obtain an interactive video.

In an example, the at least one interactive video frame and the video frame other than the at least one interactive video frame in the initial video may be rendered based on a chronos graphics engine, to obtain the interactive video. For example, for any video frame, a Draw Call call command is initiated to a graphics processing unit (GPU) or an underlying graphics library (for example, Open GL) is invoked based on the video frame, to perform a rendering operation.

In the foregoing manner, the interactive component is added to the video frame, to obtain the interactive video frame. The interactive video frame is rendered, and the video frame other than the interactive video frame in the initial video is rendered, so that the interaction logic and the video are fused. Rendering results are combined based on the playing order, to obtain an interactive video with an interactive capability.

It should be noted that the interactive video generation method in this application can be implemented in the foregoing manner. After the interactive video is generated, the interactive video may be played. Then, playing of the interactive video is briefly described.

In a specific implementation, the interactive video may be obtained, and the 1st sub-video in the interactive video may be played. The interactive component may be displayed when the 1st sub-video is played to the interaction location. In response to a selection operation performed by the user on the interactive component, a next sub-video may be determined and played until a video end is played.

Figure 4:
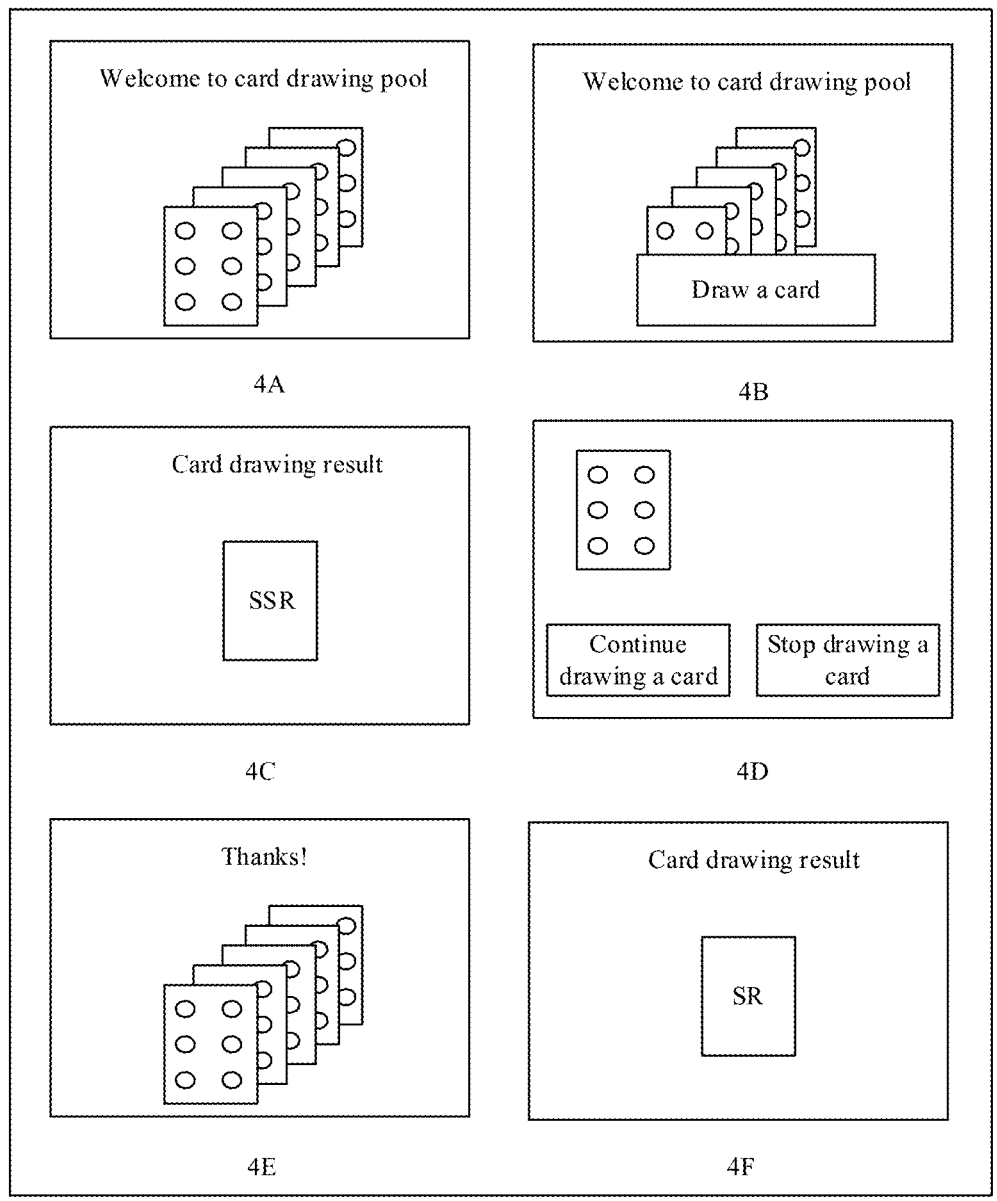
FIG. 4 is a schematic diagram of displaying an interactive video according to an embodiment of this application.

For example, referring to FIG. 4, the interactive component includes an interactive option related to a plot selection behavior. It is assumed that a main plot of the interactive video is drawing a card. The 1st sub-video may be played after the interactive video is obtained. 4A shows a video image of a video frame of the 1st sub-video. When the 1st sub-video is played to the interaction location, that is, the last frame of the 1st sub-video, the interactive component may be triggered, and a video image in 4B may be displayed. After the user taps an interactive component "Draw a card", a next sub-video may be played. 4C shows a video image of a video frame of the 2nd sub-video. When the 2nd sub-video is played to the interaction location, that is, the last frame of the 2nd sub-video, the interactive component may be triggered, and a video image in 4D may be displayed. The video image includes two options "Continue drawing a card" and "Stop drawing a card", and the user may perform selection. Assuming that the user selects "Stop drawing a card", a next sub-video, namely, the 3rd sub-video, may continue to be played. 4E shows a video image of a video frame of the 3rd sub-video. Assuming that the user selects "Continue drawing a card", the 2nd sub-video or a sub-video in parallel with the 2nd sub-video may be played. In other words, a different sub-video is played each time the user chooses to draw a card. Therefore, a different card may be drawn. 4F shows a video image of a video frame of a sub-video in parallel with the 2nd sub-video.

Figure 5:
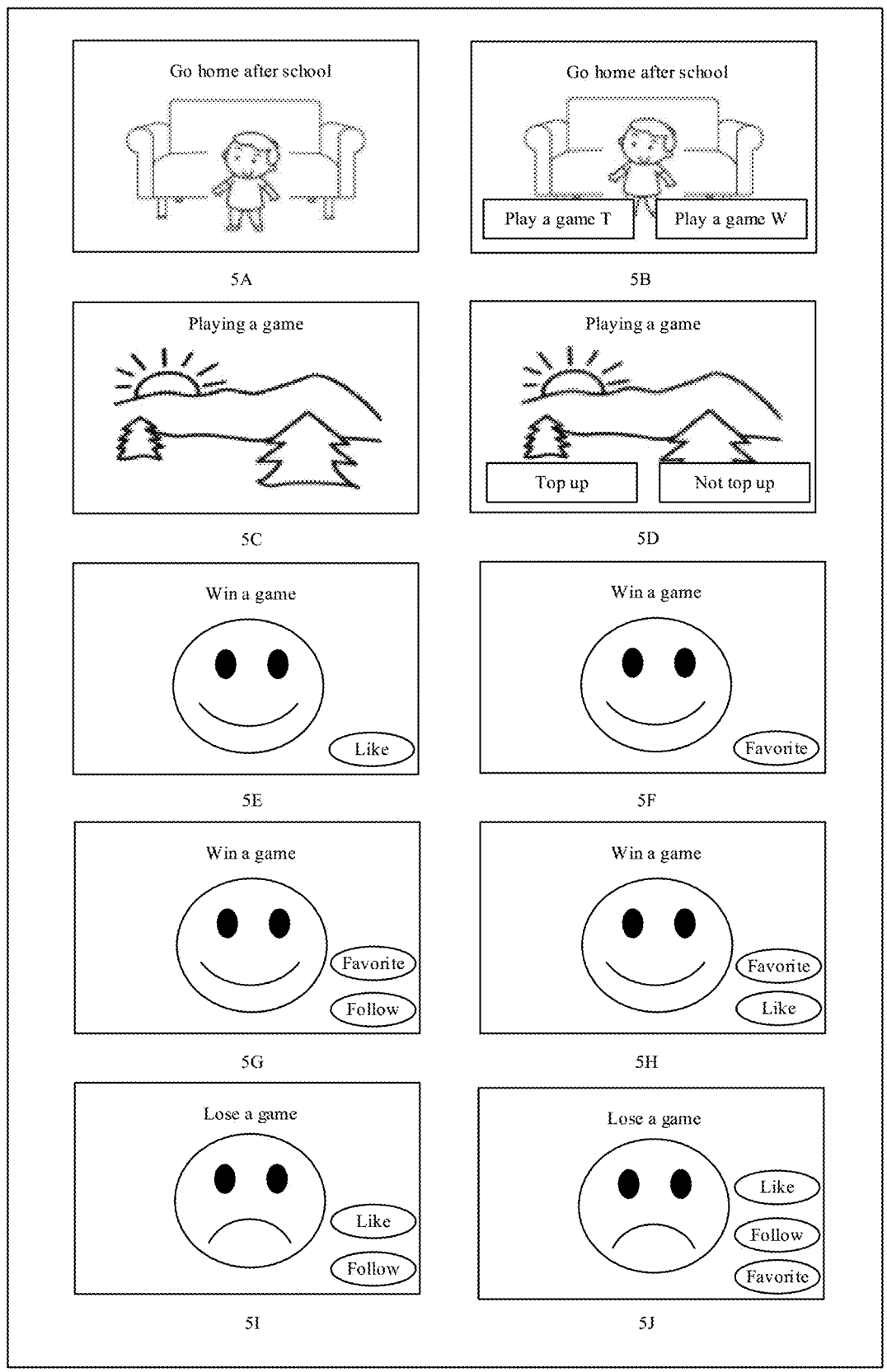
FIG. 5 is another schematic diagram of displaying an interactive video according to an embodiment of this application.

For example, referring to FIG. 5, the interactive component may include an interactive option related to the plot selection behavior. Refer to 5A to 5D in FIG. 5. It is assumed that a main plot of the interactive video is playing a game. The 1st sub-video may be played after the interactive video is obtained. 5A shows a video image of a video frame of the 1st sub-video. When the 1st sub-video is played to the interaction location, that is, the last frame of the 1st sub-video, the interactive component may be triggered, and a video image in 5B may be displayed. The video image includes two options "Play a game T" and "Play a game W", and the user may perform selection. If the user selects "Play a game T", the 2nd sub-video may be played. 5C shows a video image of a video frame of the 2nd sub-video. When the 2nd sub-video is played to the interaction location, that is, the last frame of the 2nd sub-video, the interactive component may be triggered, and a video image in 5D may be displayed. The video image includes two options "Top up" and "Not top up", and the user may perform selection.

In addition, the interactive component may further include an option related to a comment of the interactive video. For example, the interactive component includes one interaction behavior. Refer to 5E and 5F in FIG. 5. When the video image in 5D is displayed, assuming that the user selects "Top up", the 3rd sub-video may continue to be played. 5E shows a video image of a video frame of the 3rd sub-video, it indicates that the user wins a game, and the video image may include an option "Like". If the user triggers the option "Like", the user may give a like to the interactive video. Alternatively, referring to 5F in FIG. 5, the video image may include an option "Favorite". If the user triggers the option "Favorite", the user may collect the interactive video. For example, the interactive component includes at least two interaction behaviors. Refer to 5G to 5J in FIG. 5. Referring to 5G in FIG. 5, the video image may include an option "Follow" and an option "Favorite". If the user triggers the option "Favorite" and the option "Follow", the user may follow an author of the interactive video, and collect the interactive video. Referring to 5H in FIG. 5, the video image may include an option "Favorite" and an option "Like". If the user triggers the option "Like" and the option "Favorite", the user may give a like to and collect the interactive video. Alternatively, assuming that the user selects "Not top up" when the video image in 5D is displayed, the 4th sub-video may continue to be played. 5I shows a video image of a video frame of the 4th sub-video, it indicates that the user loses a game, and the video image may include an option "Follow" and an option "Like". If the user triggers the option "Follow" and the option "Like", the user may give a like to the interactive video, and follow an author of the interactive video. Alternatively, referring to 5J in FIG. 5, the video image may include three options "Like", "Favorite", and "Follow". If the user triggers the options "Like", "Favorite", and "Follow", the user may give a like to the interactive video, collect the interactive video, and follow an author of the interactive video.

Figure 6:
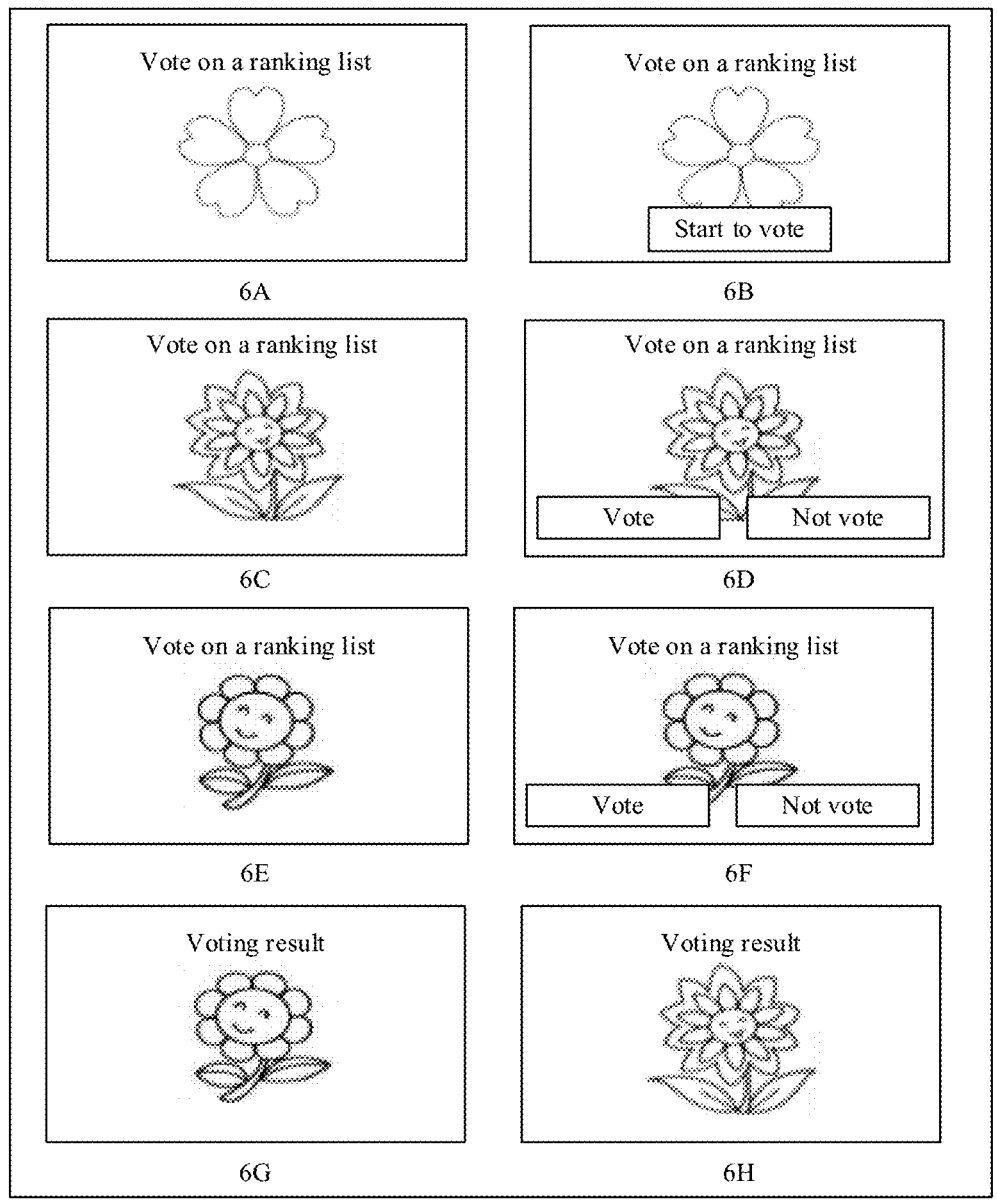
FIG. 6 is still another schematic diagram of displaying an interactive video according to an embodiment of this application.

For example, referring to FIG. 6, the interactive component includes a voting behavior. It is assumed that the interactive video is a voting video, and that voting can be performed once in the voting video. The 1st sub-video may be played after the interactive video is obtained. 6A shows a video image of a video frame of the 1st sub-video. When the 1st sub-video is played to the interaction location, that is, the last frame of the 1st sub-video, the interactive component may be triggered, and a video image in 6B may be displayed. The video image includes an option "Start to vote". If the user triggers the option, the 2nd sub-video may be played. 6C shows a video image of a video frame of the 2nd sub-video. When the 2nd sub-video is played to the interaction location, that is, the last frame of the 2nd sub-video, the interactive component may be triggered, and a video image in 6D may be displayed. The video image includes two options "Vote" and "Not vote". The user may perform selection. If the user selects "Not vote", the 2nd sub-video may be played. 6E shows a video image of a video frame of the 2nd sub-video. When the 2nd sub-video is played to the interaction location, that is, the last frame of the 2nd sub-video, the interactive component may be triggered, and a video image in 6F may be displayed. The video image includes two options "Vote" and "Not vote". The user may perform selection. If the user selects "Vote", the 3rd sub-video may be played. 6G shows a video image of a video frame of the 3rd sub-video. The video image may display a voting result of the user. In addition, if the user selects "Vote" when the video image in 6D is displayed, the 4th sub-video may continue to be played. 6H shows a video image of a video frame of the 4th sub-video. The video image may display a voting result of the user.

A person skilled in the art should understand that, an interaction function corresponding to the interactive component, a display manner of the interactive video, and the like in this application are merely an example, and do not limit this application. Another interactive component is also applicable to this application, and falls within the protection scope of this application.

In the interactive video generation method provided in this application, the original video is obtained, the interactive track is created for the original video to obtain the initial video, and the interactive component is added to the interactive track; and the at least one interactive video frame and the video frame of the initial video are rendered based on the interactive component, to obtain the interactive video. In this solution, the interactive track is created for the original video to obtain the initial video, and the interactive component is added to the interactive track, to fuse interaction logic and the initial video. In addition, the video frame is rendered based on the interactive component, to obtain the interactive video. The interactive video includes the interaction logic. In this way, an interactive video with an interactive capability can be obtained without additionally adding a data channel to implement an interaction function, to reduce processing load of a terminal, and reduce resource consumption of the terminal.

Figure 7:
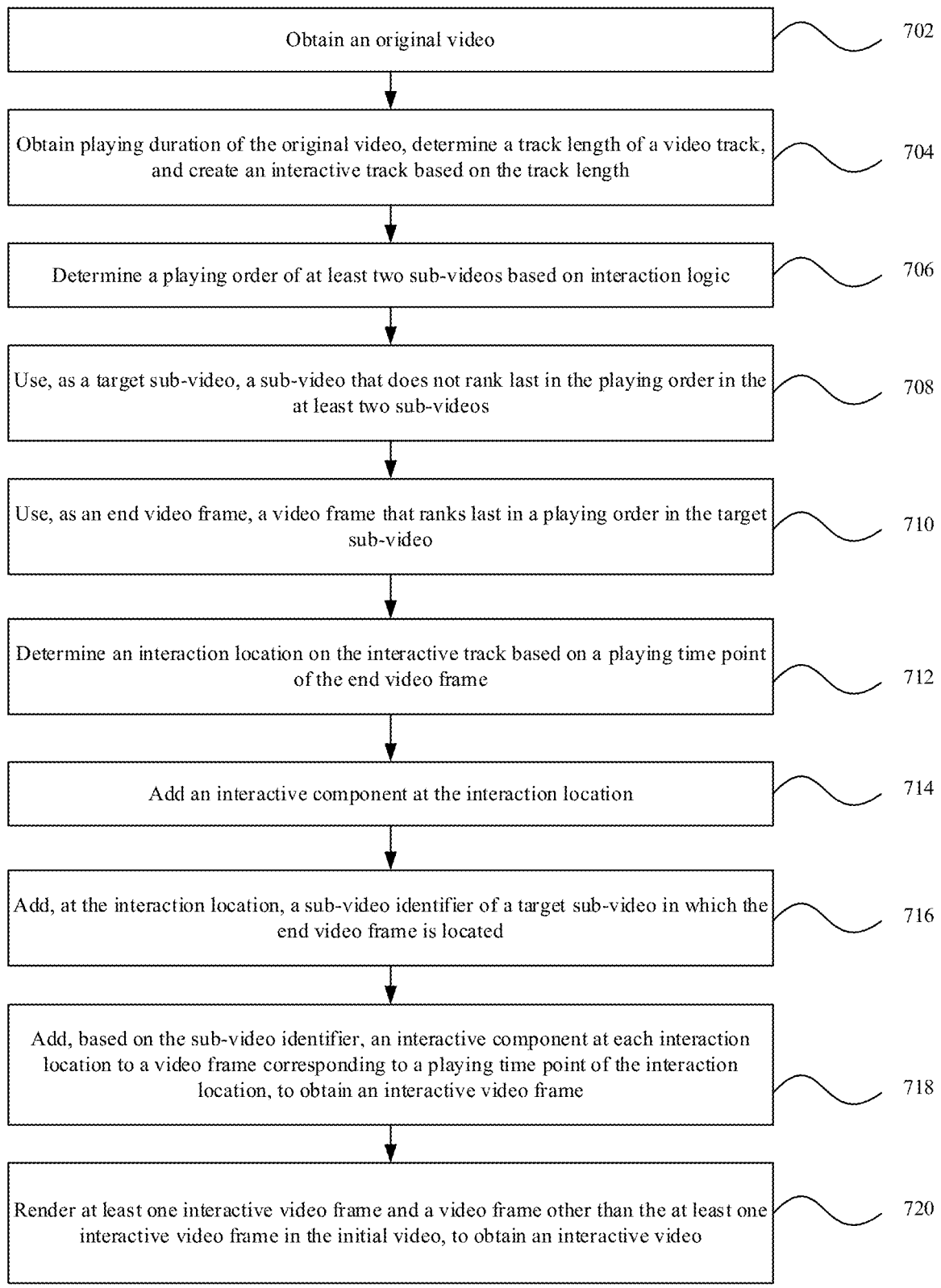
FIG. 7 is a processing flowchart of an interactive video generation method applied to a video production scenario according to an embodiment of this application.

The interactive video generation method is further described below with reference to FIG. 7 by using an application of the interactive video generation method in a video production scenario as an example. FIG. 7 is a processing flowchart of an interactive video generation method applied to a video production scenario according to an embodiment of this application. The method specifically includes the following steps.

Step 702: Obtain an original video.

For example, a video of interest may be downloaded by using a terminal, video clipping is performed, and an obtained video is used as the original video.

Step 704: Obtain playing duration of the original video, determine a track length of a video track, and create an interactive track based on the track length.

For example, assuming that the playing duration of the original video is 10 seconds and that 1 second includes 24 frames of video images, standard playing duration is 240 frames, and a preset duration-length ratio is that 10 frames correspond to 1 centimeter. Therefore, the track length of the video track of the original video is 24 centimeters. If the original video is opened in video editing software, the video track of the original video may be displayed on a page of the terminal, and the page may include an option "Add a track." An interactive track whose length is 24 centimeters may be generated in response to a selection operation performed on the option.

Step 706: Determine a playing order of at least two sub-videos based on interaction logic.

For example, referring to 2A in FIG. 2, it is assumed that the at least two sub-videos are three sub-videos: a sub-video A, a sub-video B, and a sub-video C, a plot of the sub-video A is that a target is shot and a bullet flies out, a plot of a sub-video B is that the bullet hits a bullseye and the target is broken, and a plot of a sub-video C is that the bullet does not hit a bullseye and the target is intact. It may be determined, based on the interaction logic, that the sub-video A ranks before the sub-video B and the sub-video C in a playing order, and the sub-video B and the sub-video C rank the same in the playing order.

Step 708: Use, as a target sub-video, a sub-video that does not rank last in the playing order in the at least two sub-videos.

The foregoing example is still used. It may be determined, based on the interaction logic, that the sub-video A ranks before the sub-video B and the sub-video C in the playing order, and the sub-video B and the sub-video C rank the same in the playing order, but only one of the sub-video B and the sub-video C can be played. It may be determined that the sub-video B and the sub-video C each are a sub-video that ranks last in the playing order. Therefore, the sub-video A may be determined as a target sub-video.

Step 710: Use, as an end video frame, a video frame that ranks last in a playing order in the target sub-video.

The foregoing example is still used. At least one video frame of the sub-video A is obtained. Assuming that playing duration of the sub-video A is 3 seconds, standard playing duration of the sub-video A is 72 frames, and the 72nd frame may be used as an end video frame.

Step 712: Determine an interaction location on the interactive track based on a playing time point of the end video frame.

The foregoing example is still used. Assuming that the target sub-video is a sub-video that ranks first in a playing order in the initial video, a playing time point (the 3rd second) of the 72nd frame in the target sub-video may be obtained. Because a duration-length ratio on the interactive track is that 10 frames correspond to 1 centimeter, the interaction location is the 7.2nd centimeter.

Step 714: Add an interactive component at the interaction location.

The foregoing example is still used. The interactive component may be added at the interaction location, namely, the 7.2nd centimeter.

Step 716: Add, at the interaction location, a sub-video identifier of the target sub-video in which the end video frame is located.

The foregoing example is still used. A sub-video identifier A is added at the interaction location, namely, the 7.2nd centimeter.

Step 718: Add, based on the sub-video identifier, an interactive component at each interaction location to a video frame corresponding to a playing time point of the interaction location, to obtain an interactive video frame.

The foregoing example is still used. The interactive component at the interaction location, namely, the 7.2nd centimeter, is added to a video frame that is the 72nd frame, to obtain the interactive video frame.

Step 720: Render at least one interactive video frame and a video frame other than the at least one interactive video frame in the initial video, to obtain an interactive video.

In the interactive video generation method provided in this application, the original video is obtained, the interactive track is created for the original video to obtain the initial video, and the interactive component is added to the interactive track; and the at least one interactive video frame and the video frame of the initial video are rendered based on the interactive component, to obtain the interactive video. In this solution, the interactive track is created for the original video to obtain the initial video, and the interactive component is added to the interactive track, to fuse interaction logic and the initial video. In addition, the video frame is rendered based on the interactive component, to obtain the interactive video. The interactive video includes the interaction logic. In this way, an interactive video with an interactive capability can be obtained without additionally adding a data channel to implement an interaction function, to reduce processing load of a terminal, and reduce resource consumption of the terminal.

Figure 8:
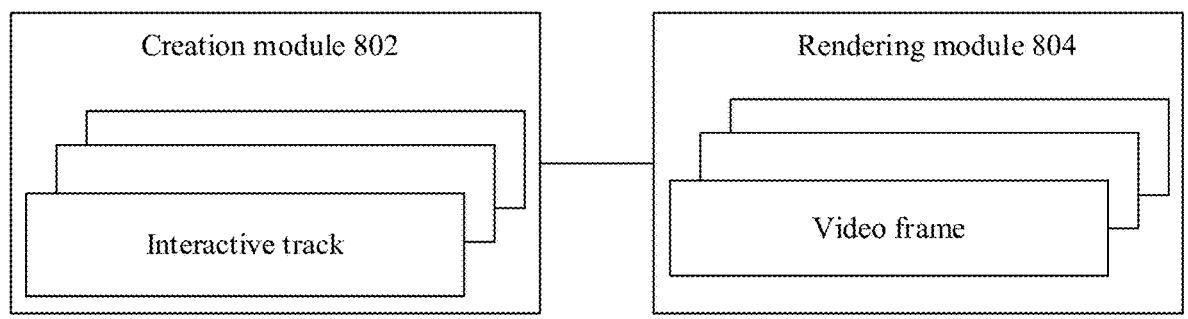
FIG. 8 is a schematic diagram of a structure of an interactive video generation apparatus according to an embodiment of this application.

Corresponding to the method embodiments, this application further provides an embodiment of an interactive video generation apparatus. FIG. 8 is a schematic diagram of a structure of an interactive video generation apparatus according to an embodiment of this application. As shown in FIG. 8, the apparatus includes:

a creation module 802, configured to: obtain an original video, create an interactive track for the original video to obtain an initial video, and add an interactive component to the interactive track; and a rendering module 804, configured to render at least one interactive video frame and a video frame of the initial video based on the interactive component, to obtain an interactive video.

Optionally, the creation module 802 is configured to:
obtain playing duration of the original video, and determine a track length of a video track; and
create the interactive track based on the track length.

Optionally, the creation module 802 is configured to:
the initial video includes at least two sub-videos, determine a playing order of the at least two sub-videos based on interaction logic;
use, as a target sub-video, a sub-video that does not rank last in the playing order in the at least two sub-videos; and
add the interactive component to the interactive track based on a playing time point of at least one video frame of the target sub-video.

Optionally, the creation module 802 is configured to:
use, as an end video frame, a video frame that ranks last in a playing order in the target sub-video; and
add the interactive component to the interactive track based on a playing time point of the end video frame.

Optionally, the creation module 802 is configured to:
determine an interaction location on the interactive track based on the playing time point of the end video frame; and
add the interactive component at the interaction location.

Optionally, the rendering module 804 is further configured to:
add an interactive component at each interaction location to a video frame corresponding to a playing time point of the interaction location, to obtain the at least one interactive video frame; and
render the at least one interactive video frame and a video frame other than the at least one interactive video frame in the initial video, to obtain the interactive video.

Optionally, the creation module 802 is further configured to:
preset an interactive node in the initial video;
determine an interaction location on the interactive track based on the interactive node, and add the interactive component at the interaction location.

In the interactive video generation method provided in this application, the original video is obtained, the interactive track is created for the original video to obtain the initial video, and the interactive component is added to the interactive track; and the at least one interactive video frame and the video frame of the initial video are rendered based on the interactive component, to obtain the interactive video. In this solution, the interactive track is created for the original video to obtain the initial video, and the interactive component is added to the interactive track, to fuse interaction logic and the initial video. In addition, the video frame is rendered based on the interactive component, to obtain the interactive video. The interactive video includes the interaction logic. In this way, an interactive video with an interactive capability can be obtained without additionally adding a data channel to implement an interaction function, to reduce processing load of a terminal, and reduce resource consumption of the terminal.

The foregoing describes the schematic solution of the interactive video generation apparatus in this embodiment. It should be noted that, the technical solution of the interactive video generation apparatus and the technical solution of the interactive video generation method belong to a same concept. For details not described in detail in the technical solution of the interactive video generation apparatus, refer to the descriptions of the technical solution of the interactive video generation method.

Figure 9:
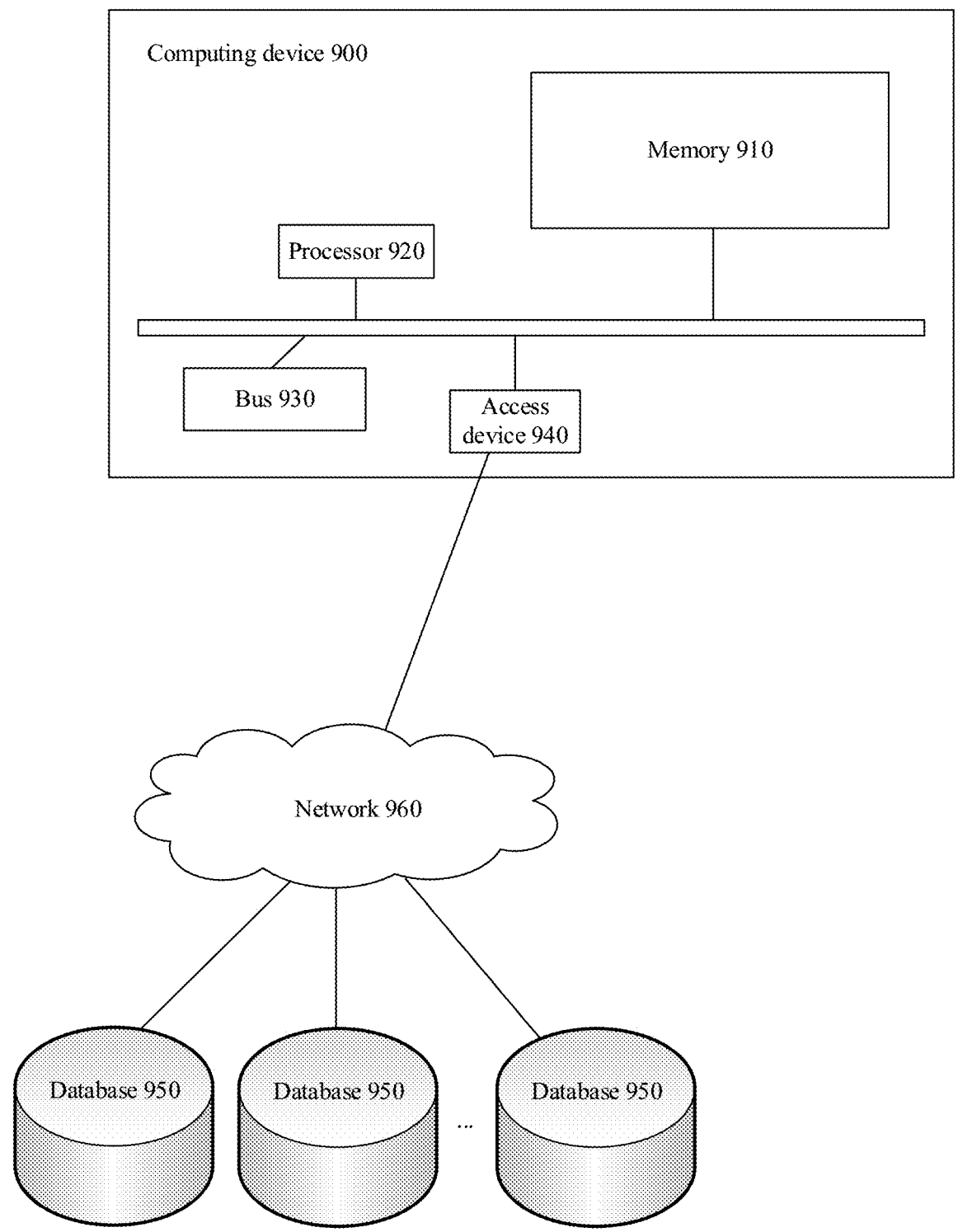
FIG. 9 is a block diagram of a structure of a computing device according to an embodiment of this application.

FIG. 9 is a block diagram of a structure of a computing device 900 according to an embodiment of this application. Components of the computing device 900 include, but are not limited to, a memory 910 and a processor 920. The processor 920 and the memory 910 are connected by using a bus 930, and a database 950 is configured to store data.

The computing device 900 further includes an access device 940, and the access device 940 enables the computing device 900 to perform communication by using one or more networks 960. Examples of these networks include a public switched telephone network (PSTN), a local area network (LAN), a wide area network (WAN), a private area network (PAN), or a combination of communication networks such as the Internet. The access device 940 may include one or more of any type of wired or wireless network interfaces (for example, a network interface card (NIC)), such as an IEEE902.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In an embodiment of this application, the foregoing components of the computing device 900 and other components not shown in FIG. 9 may alternatively be connected to each other, for example, by using the bus. It should be understood that the block diagram of the structure of the computing device shown in FIG. 9 is merely used as an example instead of a limitation on the scope of this application. A person skilled in the art can add or replace other components based on a requirement.

The computing device 900 may be any type of still or mobile computing device, including a mobile device such as a mobile computer or a mobile computing device (for example, a tablet computer, a personal digital assistant, a laptop computer, a notebook computer, and a netbook), a mobile phone (for example, a smartphone), or a wearable computing device (for example, a smartwatch and smart glasses), or a still computing device such as a desktop computer or a personal computer (PC). The computing device 900 may alternatively be a mobile or still server.

The processor 920 performs the steps of the interactive video generation method when executing instructions.

The foregoing describes the schematic solution of the computing device in this embodiment. It should be noted that the technical solution of the computing device and the technical solution of the interactive video generation method belong to a same concept. For details not described in detail in the technical solution of the computing device, refer to the descriptions of the technical solution of the interactive video generation method.

An embodiment of this application further provides a computer-readable storage medium. The computer-readable storage medium stores computer instructions, and when the instructions are executed by a processor, the steps of the interactive video generation method are implemented.

The foregoing describes the schematic solution of the computer-readable storage medium in this embodiment. It should be noted that the technical solution of the storage medium and the technical solution of the interactive video generation method belong to a same concept. For details not described in detail in the technical solution of the storage medium, refer to the descriptions of the technical solution of the interactive video generation method.

Specific embodiments of this application are described above. Other embodiments fall within the scope of the appended claims. In some cases, actions or steps described in the claims may be performed in an order different from that in the embodiments and desired results may still be achieved. In addition, processes described in the accompanying drawings do not necessarily require the shown specific order or a sequential order to achieve the desired results. In some implementations, multi-task processing and parallel processing are also possible or may be advantageous.

The computer instructions includes computer program code, and the computer program code may be in a source code form, an object code form, an executable file, an intermediate form, or the like. The computer-readable medium may include any entity or apparatus, a recording medium, a USB flash drive, a removable hard disk, a magnetic disk, a compact disc, a computer memory, a read-only memory (ROM), a random access memory (RAM), an electrical carrier signal, a telecommunications signal, a software distribution medium, and the like that can carry the computer program code. It should be noted that content included in the computer-readable medium may be appropriately added or deleted based on requirements of legislation and patent practice in a jurisdiction, for example, in some jurisdictions, according to legislation and patent practice, the computer-readable medium includes does not include an electrical carrier signal and a telecommunications signal.

It should be noted that, for brief description, the foregoing method embodiments are represented as a combination of a series of actions. However, a person skilled in the art should be aware that this application is not limited to the described action sequence, because according to this application, some steps may be performed in another order or simultaneously. In addition, a person skilled in the art should also be aware that the embodiments described in this specification are preferred embodiments, and that the actions and modules involved are not necessarily required for this application.

In the foregoing embodiments, the descriptions of various embodiments have respective focuses. For a part that is not described in detail in an embodiment, refer to related descriptions in other embodiments.

The foregoing disclosed preferred embodiments of this application are only intended to help describe this application. The optional embodiments neither describe all the details in detail, nor limit the present invention only to specific implementations. Obviously, many modifications and changes may be made based on the content of this application. In this application, these embodiments are selected and specifically described to better explain the principle and practical application of this application, so that a person skilled in the art can well understand and use this application. This application is only limited by the claims and a full scope and equivalents thereof.

What is claimed is:

1. An interactive video generation method, comprising:
    obtaining an original video having no interaction function;
    creating an interactive track based on the original video to obtain an initial video, the initial video comprising at least one video track from the original video and the created interactive track, wherein the created interactive track is configured to implement interaction functions and the created interactive track enables interaction logic to be fused into the initial video, and wherein the creating an interactive track based on the original video comprises:
        obtaining a duration of playing the original video,
        converting the duration of playing the original video into a standard duration measured by frame,
        determining a track length based on the standard duration and a duration-length ratio, and
        creating the interactive track based on the determined track length;
    adding at least one interactive component to the created interactive track, wherein the at least one interactive component is configured to encapsulate at least one interaction function; and
    generating an interactive video by rendering together at least one video frame of the initial video and at least one interactive frame based on the added at least one interactive component, wherein the interaction logic is fused into the interactive video during the rendering.

2. The interactive video generation method according to claim 1, wherein the initial video comprises at least two sub-videos, and the adding at least one interactive component to the interactive track comprises:
    determining a playing order of the at least two sub-videos based on the interaction logic;
    identifying a target sub-video, the target sub-video being one of the at least two sub-videos that is not a last one to be played according to the playing order of the at least two sub-videos; and
    adding the at least one interactive component to the interactive track based on a time point of playing at least one video frame of the target sub-video.

3. The interactive video generation method according to claim 2, wherein the adding the at least one interactive component to the interactive track based on a time point of playing at least one video frame of the target sub-video comprises:
    identifying a last video frame of the target sub-video as an end video frame; and
    adding an interactive component to the interactive track based on a time point of playing the end video frame.

4. The interactive video generation method according to claim 3, wherein the adding an interactive component to the interactive track based on a time point of playing the end video frame comprises:
    determining an interaction location on the interactive track based on the time point of playing the end video frame; and
    adding the interactive component at the interaction location.

5. The interactive video generation method according to claim 1, wherein before the rendering at least one interactive video frame and other video frames of the initial video based on the interactive component, the method further comprises:
    creating the at least one interactive video frame by adding an interactive component at each interaction location on the interactive track to a video frame with a playing time point corresponding to each interaction location.

6. The interactive video generation method according to claim 1, wherein the adding at least one interactive component to the interactive track comprises:
    determining an interaction location on the interactive track based on an interactive node preset in the initial video; and
    adding an interactive component at the interaction location.

7. A computing device, comprising a memory, a processor, wherein the memory stores instructions being executable by the processor, and wherein the instructions upon execution by the processor cause the processor to implement operations comprising:
    obtaining an original video having no interaction function;
    creating an interactive track based on the original video to obtain an initial video, the initial video comprising at least one video track from the original video and the created interactive track, wherein the created interactive track is configured to implement interaction functions and the created interactive track enables interaction logic to be fused into the initial video, and wherein the creating an interactive track based on the original video comprises:
        obtaining a duration of playing the original video,
        converting the duration of playing the original video into a standard duration measured by frame,
        determining a track length based on the standard duration and a duration-length ratio, and
        creating the interactive track based on the determined track length;
    adding at least one interactive component to the created interactive track, wherein the at least one interactive component is configured to encapsulate at least one interaction function; and
    generating an interactive video by rendering together at least one video frame of the initial video and at least one interactive frame based on the added at least one interactive component, wherein the interaction logic is fused into the interactive video during the rendering.

8. The computing device according to claim 7, wherein the initial video comprises at least two sub-videos, and the adding at least one interactive component to the interactive track comprises:
    determining a playing order of the at least two sub-videos based on the interaction logic;
    identifying a target sub-video, the target sub-video being one of the at least two sub-videos that is not a last one to be played according to the playing order of the at least two sub-videos; and
    adding the at least one interactive component to the interactive track based on a time point of playing at least one video frame of the target sub-video.

9. The computing device according to claim 8, wherein the adding the at least one interactive component to the interactive track based on a time point of playing at least one video frame of the target sub-video comprises:
    identifying a last video frame of the target sub-video as an end video frame; and adding an interactive component to the interactive track based on a time point of playing the end video frame.

10. The computing device according to claim 9, wherein the adding an interactive component to the interactive track based on a time point of playing the end video frame comprises:
  determining an interaction location on the interactive track based on the time point of playing the end video frame; and
  adding the interactive component at the interaction location.

11. The computing device according to claim 7, wherein before the rendering at least one interactive video frame and other video frames of the initial video based on the interactive component, the operations further comprise:
  creating the at least one interactive video frame by adding an interactive component at each interaction location on the interactive track to a video frame with a playing time point corresponding to each interaction location.

12. The computing device according to claim 7, wherein the adding at least one interactive component to the interactive track comprises:
  determining an interaction location on the interactive track based on an interactive node preset in the initial video; and
  adding an interactive component at the interaction location.

13. A non-transitory computer-readable storage medium, wherein the computer-readable storage medium stores instructions being executable by a processor, and wherein when the instructions upon execution by the processor cause the processor to implement operations comprising:
  obtaining an original video having no interaction function;
  creating an interactive track based on the original video to obtain an initial video, the initial video comprising at least one video track from the original video and the created interactive track, wherein the created interactive track is configured to implement interaction functions and the created interactive track enables interaction logic to be fused into the initial video, and wherein the creating an interactive track based on the original video comprises:
    obtaining a duration of playing the original video,
    converting the duration of playing the original video into a standard duration measured by frame,
    determining a track length based on the standard duration and a duration-length ratio, and
    creating the interactive track based on the determined track length;
  adding at least one interactive component to the created interactive track, wherein the at least one interactive component is configured to encapsulate at least one interaction function; and
  generating an interactive video by rendering together at least one video frame of the initial video and at least one interactive frame based on the added at least one interactive component, wherein the interaction logic is fused into the interactive video during the rendering.

14. The non-transitory computer-readable storage medium according to claim 13, wherein the initial video comprises at least two sub-videos, and the adding at least one interactive component to the interactive track comprises:
  determining a playing order of the at least two sub-videos based on the interaction logic;
  identifying a target sub-video, the target sub-video being one of the at least two sub-videos that is not a last one to be played according to the playing order of the at least two sub-videos; and
  adding the at least one interactive component to the interactive track based on a time point of playing at least one video frame of the target sub-video.

15. The non-transitory computer-readable storage medium according to claim 14, wherein the adding the at least one interactive component to the interactive track based on a time point of playing at least one video frame of the target sub-video comprises:
  identifying a last video frame of the target sub-video as an end video frame; and
  adding an interactive component to the interactive track based on a time point of playing the end video frame.

16. The non-transitory computer-readable storage medium according to claim 15, wherein the adding an interactive component to the interactive track based on a time point of playing the end video frame comprises:
  determining an interaction location on the interactive track based on the time point of playing the end video frame; and
  adding the interactive component at the interaction location.

17. The non-transitory computer-readable storage medium according to claim 13, wherein before the rendering at least one interactive video frame and other video frames of the initial video based on the interactive component, the operations further comprise:
  creating the at least one interactive video frame by adding an interactive component at each interaction location on the interactive track to a video frame with a playing time point corresponding to each interaction location.

* * * * *